US011396471B2

(12) United States Patent
Plapper et al.

(10) Patent No.: US 11,396,471 B2
(45) Date of Patent: Jul. 26, 2022

(54) METHOD FOR MACHINING THE EDGES OF GLASS ELEMENTS AND GLASS ELEMENT MACHINED ACCORDING TO THE METHOD

(71) Applicant: SCHOTT AG, Mainz (DE)

(72) Inventors: Volker Plapper, Alzey (DE); Fabian Wagner, Mainz (DE); Andreas Ortner, Gau-Algesheim (DE); Albrecht Seidl, Niedernberg (DE); Frank-Thomas Lentes, Bingen (DE)

(73) Assignee: SCHOTT AG, Mainz (DE)

( * ) Notice: Subject to any disclaimer, the term of this patent is extended or adjusted under 35 U.S.C. 154(b) by 126 days.

(21) Appl. No.: 17/021,198

(22) Filed: Sep. 15, 2020

(65) Prior Publication Data

US 2020/0407263 A1   Dec. 31, 2020

Related U.S. Application Data

(60) Division of application No. 16/104,510, filed on Aug. 17, 2018, now Pat. No. 10,807,902, which is a
(Continued)

(30) Foreign Application Priority Data

Feb. 17, 2016   (DE) .......................... 102016102768.5

(51) Int. Cl.
*B32B 3/10*   (2006.01)
*C03B 33/02*   (2006.01)
(Continued)

(52) U.S. Cl.
CPC ...... *C03B 33/0222* (2013.01); *B23K 26/0006* (2013.01); *B23K 26/0624* (2015.10);
(Continued)

(58) Field of Classification Search
None
See application file for complete search history.

(56) References Cited

U.S. PATENT DOCUMENTS

2010/0279067 A1* 11/2010 Sabia .................... C03B 17/064
428/141
2012/0234807 A1   9/2012 Sercel
(Continued)

FOREIGN PATENT DOCUMENTS

CN   102785031   11/2012
CN   105189024   12/2015
(Continued)

OTHER PUBLICATIONS

International Search Report dated Mar. 2, 2017 from corresponding International Application PCT/EP2016/079411.
(Continued)

*Primary Examiner* — Christopher M Polley
(74) *Attorney, Agent, or Firm* — Ohlandt, Greeley, Ruggiero & Perle, L.L.P.

(57) ABSTRACT

A method for the production of glass or glass ceramic elements from flat glass or glass ceramic parts is provided where the edges of the glass or glass ceramic elements are treated by a combination of two processes. The flat glass or glass ceramic element with an edge surface connecting the two side surfaces is produced. The edge surface has at least one first elongated, strip-shaped edge region and at least one second elongated strip-shaped edge region, which are formed by a ground edge. The edge regions extend in the longitudinal direction along the edge surface and along the side surfaces. The first edge region has elongated parallel filamentary damages that are parallel and adjacent to one another and, in particular, spaced apart equidistantly, in the
(Continued)

longitudinal direction thereof extending transversely to the side surfaces and along the surface of the first edge region.

16 Claims, 4 Drawing Sheets

Related U.S. Application Data continuation of application No. PCT/EP2016/079411, filed on Dec. 1, 2016.

(51) Int. Cl.
    *B24D 3/00*     (2006.01)
    *B23K 26/0622*     (2014.01)
    *B23K 26/53*     (2014.01)
    *B23K 26/00*     (2014.01)
    *B23K 103/00*     (2006.01)

(52) U.S. Cl.
    CPC ............. *B23K 26/53* (2015.10); *B24D 3/00* (2013.01); *B23K 2103/54* (2018.08)

(56) References Cited

U.S. PATENT DOCUMENTS

| | | | | |
|---|---|---|---|---|
| 2013/0005222 A1* | 1/2013 | Brown | ............... | B24B 9/065 451/44 |
| 2013/0224439 A1* | 8/2013 | Zhang | ............... | C03B 33/0222 428/156 |
| 2014/0027951 A1* | 1/2014 | Srinivas | ............... | B23K 26/009 264/400 |
| 2014/0199519 A1 | 7/2014 | Schillinger | | |
| 2014/0239552 A1 | 8/2014 | Srinivas | | |
| 2014/0340730 A1 | 11/2014 | Bergh | | |
| 2015/0158120 A1 | 6/2015 | Courvoisier | | |
| 2015/0165548 A1* | 6/2015 | Marjanovic | ........... | C03B 33/091 219/121.73 |
| 2015/0166393 A1 | 6/2015 | Marjanovic | | |
| 2015/0166394 A1* | 6/2015 | Marjanovic | ............ | B23K 26/53 428/192 |
| 2015/0166395 A1 | 6/2015 | Marjanovic | | |
| 2015/0232369 A1 | 8/2015 | Marjanovic | | |
| 2016/0060156 A1 | 3/2016 | Krueger | | |
| 2016/0280580 A1* | 9/2016 | Bohme | ................. | B23K 26/38 |
| 2018/0029919 A1* | 2/2018 | Schnitzler | .......... | B23K 26/0624 |

FOREIGN PATENT DOCUMENTS

| | | |
|---|---|---|
| CN | 105209218 | 12/2015 |
| FR | 2989294 | 10/2013 |
| JP | 2008266046 | 11/2008 |
| KR | 20140072448 | 6/2014 |
| WO | 2012006736 | 1/2012 |
| WO | 2015113026 | 7/2015 |

OTHER PUBLICATIONS

International Preliminary Report on Patentability dated Jun. 8, 2018 from corresponding International Application PCT/EP2016/079411.

* cited by examiner

METHOD FOR MACHINING THE EDGES OF GLASS ELEMENTS AND GLASS ELEMENT MACHINED ACCORDING TO THE METHOD

CROSS REFERENCE TO RELATED APPLICATIONS

This application is a divisional of U.S. application Ser. No. 16/104,510 filed Aug. 17, 2018, which is a continuation of International Application No. PCT/EP2016/079411 filed Dec. 1, 2016, which claims the benefit under 35 USC § 119(a) of German Application No. 10 2016 102 768.5 filed Feb. 17, 2016, the entire contents of all of which are incorporated herein by reference.

BACKGROUND

1. Field of the Invention

The invention relates, in general, to the processing of the edges of sheets of glass. In particular, the invention relates to a processing of the edges with different methods.

2. Description of Related Art

Typically, for the production of a flat glass or glass ceramic element, a larger flat element is divided by one or a plurality of separating steps and thereby brought to the desired dimension. Subsequently, in general, a processing of the edge is necessary. For separation, mechanical scoring and breaking has become established practice, but also fusing or abrasive processes such as water-jet separation are known.

Each of these methods has certain drawbacks, such as, for instance, a low mechanical strength or a low dimensional accuracy. Thus, during scoring and breaking, for example, the shape errors increase with increasing thickness owing to breaks induced at an angle. In the case of water-jet cutting, a separating surface that runs at an angle is formed due to the method, because, during water-jet cutting, a groove that tapers in a wedge shape is produced.

In the different separating processes, however, conchoidal fractures and microcracks can occur at the edges, as a result of which the resulting strength is greatly reduced or the intended contour of the workpiece is altered.

With increasing crack length, the strength of the edge is diminished, wherein the following applies:

$$a = \left(\frac{K_{1c}}{2\sigma_{res}}\right)^2$$

Here, $K_{1c}$ is the critical stress intensity factor of the material, a is the crack length, and $\sigma_{res}$ is the maximum stress load on the crack before the microcrack becomes enlarged.

Typically, during the post-processing, special geometries (C-cut, flat cut, small facets) are produced by using a special shaping tool. Depending on the input quality, this processing step is also multistage as well, with the edge being machined using different tools of different grit in succession.

Because the accurate course of the edge cannot always be exactly maintained during separation, an allowance is generally reserved. The allowance is then removed during the post-processing of the edge.

Finally, in multistage processes, it is also necessary to remove subsurface damages by a first grinding process through the steps that follow. Provided as the first shaping grinding step in this case is coarse grinding for straightening the edge or for creating a (coarse) contouring of the edge, which is important, above all, in the case of separating methods that do not produce high dimensional accuracy. The second step—fine grinding—then produces the final contour with the surface finish corresponding to the process and accordingly with the strength corresponding to the process. This is tedious, because finer grinding processes also remove the material more slowly, even though, this notwithstanding, a thicker layer needs to be ground away for elimination of the subsurface damages. Oftentimes, in this state, the surface finishes do not meet the optical requirements in regard to transparency or roughness, for example. If the obtained edge quality is not adequate, a polishing step is optionally conducted for refinement of the edge, said polishing step not resulting in any changes in the contour, but solely improving the surface finish (for example, reduced roughness, higher transparency, higher strength, . . . ). All described process steps can may be composed, in detail, of a plurality of separate process steps.

US 2015/165548 A1 describes the filamentation of a glass with subsequent polishing of the edge that is formed. In the further process, a contour is formed through double filamentation of the edge margin regions at an oblique angle. In this case, there exists the problem that, in particular in the case of glass that has not been prestressed, the small perforated edge regions (with triangular cross section) have to be split off in a process-safe manner from bulk material and removed free of splinters. A similar method is also described in US 2014/239552 A1.

Accordingly, the invention is based on the object of improving the edge processing for glasses and glass ceramics in terms of effort, accuracy, and production costs. The quality of the edge should thereby be comparable in terms of conchoidal fractures and microcracks to the strength and the visual impression of at least the production methods described above.

SUMMARY

This object is achieved by the subject matter, embodiments, and enhancements presented herein.

Utilization of an ultrashort-pulse laser enables a glass to be structured (filamented) in such a way that it can subsequently be separated. The separation is to be assisted, if need be, mechanically or thermomechanically or in a similar manner. The edge thereby formed exhibits values comparable to ground edges in terms of strength.

Surprisingly, it has been found that, on account of the accuracies of the edge that can thereby be produced, subsequent process steps, such as an edge grinding, can be employed substantially more precisely. This means that only one process step is needed to utilize this without any allowance necessary due to process engineering and, accordingly, it is possible to run the process with markedly faster process speeds. In particular, a coarse grinding can be dispensed with on account of the high accuracy during separation. Furthermore, it has also been found that, due to the high dimensional accuracy that is already achieved during the separation operation, in comparison to the fine grinding in conventional multistage grinding post-processing, markedly less material has to be removed in the subsequent grinding. In this way, the process speed can be increased by a factor of 2 and in fact, in general, by a factor of 2.5 or 3.

In particular, in terms of strength, the edge quality is comparable to a conventionally ground edge. Furthermore, it was surprisingly established that, in terms of visual appearance, an edge produced by pre-separation using an ultrashort-pulse laser does not noticeably differ from a ground edge. Accordingly, both processes can be combined for the final creation of an edge. It is accordingly possible to employ even geometrically simple tools (for example, in the case of facets) and this makes the process chain less expensive with identical quality. The grinding volume is thereby reduced still further, as a result of which the processing speed is correspondingly increased and tool wear can be markedly reduced. Furthermore, it is thereby possible to produce glass articles with accuracies that are predetermined by the laser process and are markedly greater than the present-day accuracies.

In general, the invention therefore provides a flat glass or glass ceramic element, the edge of which is processed by using a combination of two methods, namely, filamentation and cleavage or separation, on the one hand, and edge grinding, on the other hand. These methods are, therefore, the insertion of filamentary damages that lie adjacent to one another along a line and subsequent separation along said line with formation of an edge as the first method, and processing of the edge by grinding as the second method. In accordance with an especially preferred embodiment of the invention, the grinding of the edge is not produced over the entire surface, but instead is limited to one or, in particular, both of the strip-shaped margin regions of the edge surface that adjoin the side surfaces of the glass or glass ceramic element.

In particular, the invention provides for a method for the production of glass or glass ceramic elements from flat glass or glass ceramic parts, wherein filamentary damages in the interior of the glass or glass ceramic part are created adjacent to one another along a separating line and the damages are created by laser pulses of an ultrashort-pulse laser, wherein the material of the glass or glass ceramic element is at least partially transparent to the laser pulses, so that the laser radiation can penetrate into the glass or into the glass ceramic for the creation of the damages in the interior, and the pulsed laser beam and the surface of the glass or glass ceramic part are moved relative to each other, so that the points of impingement of the laser pulses on the surface of the glass or glass ceramic element line up next to one another along the separating line, and wherein after the insertion of the filamentary damages arranged adjacent to one another along the separating line, the glass or glass ceramic element is released by separation at the separating line or is worked out of the glass or glass ceramic part, and wherein the edge surface of the glass or glass ceramic element formed during separation is processed in part by grinding, so that the edge surface has at least one strip-shaped region created by the insertion of the filamentary damages and the separation, and one adjoining strip-shaped region that is further processed by grinding.

These two strip-shaped regions thereby created differ, among other things, in terms of their surface quality, although, as a rule, this difference is not perceivable to the naked eye. In the edge surface that is produced after the glass or glass ceramic element has been worked out, the previously introduced filamentary damages can be observed as structures that extend transversely to the longitudinal direction of the edge surface and are parallel to one another. In the region that is further processed by grinding, in contrast, these structures are removed, at least in part, through the removal of the material.

Accordingly, the flat glass or glass ceramic element that can be produced by using the above-described method has two opposite-lying side surfaces and an edge surface that connects the two side surfaces, wherein the edge surface comprises at least one first elongate, strip-shaped edge region and at least one second elongated strip-shaped edge region, which is formed by a ground edge. These edge regions extend in the longitudinal direction along the edge surface and along the side surface and hence parallel to the longitudinal direction of the edge surface. The first edge region has elongated filamentary damages that are spaced apart parallel to one another and the longitudinal direction of which extends transversely to the side surfaces and along the surface of the first edge region. Typically, the feed rate and also the pulse repetition rate of the laser are essentially constant during the laser processing. This is accompanied by the fact that the filamentary damages are also arranged equidistant, that is with a constant center-to-center distance with respect to one another.

The invention is especially suited for thicker substrates. In this case, there is a special advantage that the laser penetrates into the volume and can define there the intended cutting surface precisely through the introduction of a damage. In contrast, mechanical methods are able to act, in general, only from the outside and this favors the "wandering" of the cutting surface and accordingly the introduction of inaccuracies in the dimensions. In general, the invention is suited for glass or glass ceramic parts and accordingly for the production of glass or glass ceramic elements with a thickness in the range of 1 to 20 millimeters, preferably in the range of 2 to 15 millimeters, especially preferred in the range between 3 and 10 millimeters.

BRIEF DESCRIPTION OF THE DRAWINGS

The invention will be explained below in more detail with reference to the figures. In the figures, identical reference numbers refer to respectively identical or corresponding elements. Shown are.

DETAILED DESCRIPTION

Figure 1:
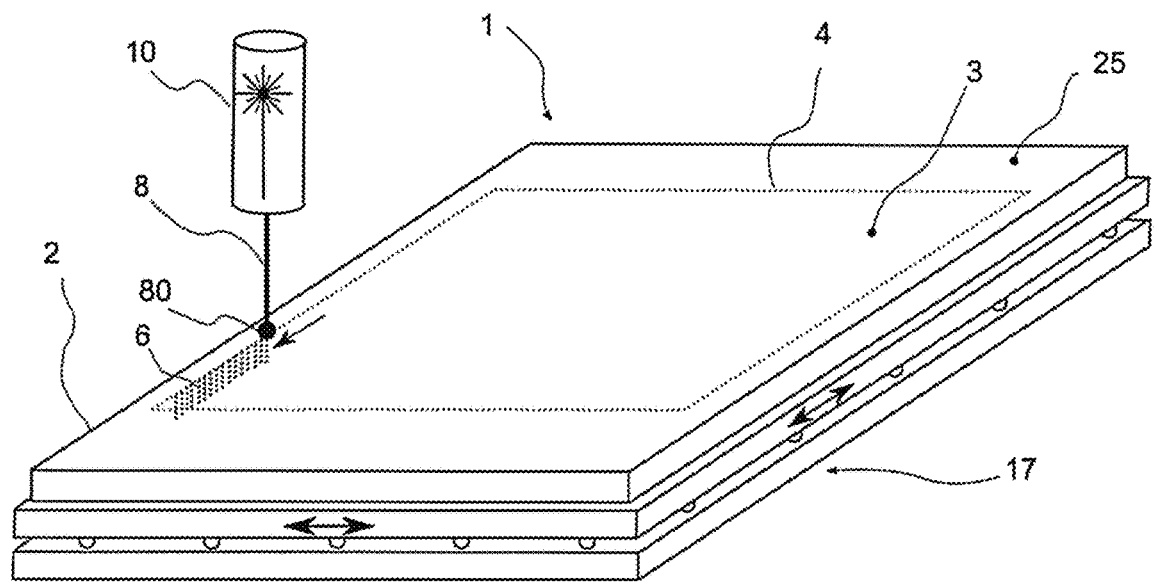
FIG. 1 a laser processing device for the insertion of filamentary damages.

For the method according to the invention, a glass or glass ceramic element 3 with fixed dimensions is worked out of a flat glass or glass ceramic part 2. FIG. 1 shows an exemplary embodiment of a laser processing device 1 for carrying out this step of the method. A pre-separation is carried out through insertion of elongated or filamentary damages along a provided separating line 4. The imaginary separating line 4 and accordingly also the course of the inserted damages 6 trace the outer contour of the glass or glass ceramic element 3 that is to be released.

Accordingly, for the example shown in FIG. 1, a rectangular element is to be cut out of the glass part or glass ceramic part 2 corresponding to the course of the imaginary separating line. The separating line 4 need not necessarily run along the entire outer contour. For example, it would also be conceivable that the outer contour of the glass or glass ceramic part 2 and of the glass or glass ceramic element 3 that is to be released coincide in part, and no pre-separation is then to be carried out along these regions.

In order to create filamentary damages 6 adjacent to one another along the separating line 4 in the interior of the glass or glass ceramic part 2, an ultrashort-pulse laser 10 is provided as a component of the device 1. The ultrashort-pulse laser 10 emits laser pulses 8, which impinge at the respective point of impingement 80 on one of the side surfaces 25 of the glass or glass ceramic part 2 and penetrate into the volume of the part. The laser pulses 8 are directed onto the side surface 25 in such a way that the points of impingement 80 lie on the separating line 4. By means of a feed device, the pulsed laser beam and the surface of the glass or glass ceramic part 2 are thereby moved relative to each other, so that the points of impingement 80 of the laser pulses 8 on the surface 20 of the glass or glass ceramic element 2 line up adjacent to one another along the separating line. In the example shown in FIG. 1, the glass or glass ceramic element 2 is moved along the separating line 4 in the direction of the arrow shown next to the point of impingement 80. As a feed device in this example, an XY table 17 is provided, with which the glass or glass ceramic part 2 can move in the plane of the side surface 25.

The formation of an elongated filamentary damage in the material can result, in particular, through self-focusing of the high-energy laser pulse. It is also possible to provide optics that produce an elongate focus in the material. An example of such optics is an axicon. Preferably, the line focus has a length of 10 mm or less as well as a diameter of 10 μm or less. Regardless of the mechanism of the focusing, the damage of the glass or glass ceramic material is caused, in particular, through the generation of a plasma by the high-energy laser light.

The elongated filamentary damages 6 are produced by multiphoton absorption, the activity ranges of which can be adjusted and formed through suitable optics. What may be involved here is a filamentation through self-focusing of a laser beam in consequence of the nonlinear Kerr effect in the focal region of a lens, the mechanism of which is described, for example, in WO 2012/006736 A2. Alternatively or additionally, however, it is also possible by way of special optics, such as, for instance, an axicon or a lens with spherical aberration, to create a linear focal region, along which the multi-photon absorption process can be brought about in a specific manner. Such optics are described, for example, in FR 2989294 A1, KR 2014 0072448 A, or US 2012/0234807 A1. The use of optics for creation of a line focus has the advantage of not having to take into account the fragile balance between Kerr focusing and plasma defocusing, so that, in practice, more uniform damages in the material can be created. It is also possible via optics to adjust in a specific manner the intensity distribution in the material and accordingly also the length of the linear damages.

In general, regardless of the kind and manner of the feed, it is preferred that the repetition rate of the ultrashort-pulse laser 10 and the feed rate during the movement of the pulsed laser beam and the surface of the glass or glass ceramic part 2 relative to each other is adjusted in such a way that the filamentary damages arranged adjacent to one another have a center-to-center distance in the range of 1 to 15 micrometers, preferably 2 to 10 micrometers. For a faster process speed, this distance ensures that the glass or glass ceramic element 3 can still be worked out simply and safely.

Especially advantageous for the creation of long filamentary damages is, in general, an operation of the ultrashort-pulse laser 10 in the burst mode. In this operating mode, the laser pulses 8 are not emitted as an individual pulse, but rather in the form of pulse packets. These pulse packets are referred to as bursts. Accordingly, in further development of the invention, an operation of the laser 10 is provided in the form of a successive emission of laser pulses in time in the form of bursts or pulse packets, wherein preferably each of these bursts is produced at one of the respective filamentary damages 6.

Such a pulse packet has, in general, a somewhat greater energy than an individual pulse in the usual single-shot operation. However, the pulses of a burst themselves contain markedly less energy than an individual pulse. Furthermore, it is typical that the pulse energies of the pulses decrease within a burst. For certain lasers, the energy distribution of the pulses within the burst can be adjusted. The burst mode can therefore be characterized in that the laser emits pulse packets, wherein the spacing in time of the pulses within a pulse packet is less than the spacing in time between two pulse packets, and wherein the pulse energy of the pulses within a pulse packet drops from pulse to pulse.

A suitable laser source in accordance with the present invention is a neodymium-doped yttrium aluminum garnet laser with a wavelength of preferably 1064±5 nanometers, but also possible are the wavelengths 532±5 or 355±5 nanometers. The laser source preferably operates with a repetition rate that lies between 5 kHz and 200 kHz, preferably between 10 kHz and 150 kHz, and most preferably between 30 kHz and 110 kHz. The scanning speed can preferably be chosen such that, depending on the repetition rate, the distance between adjacent filamentary damages lies in the range of 2 micrometers to 10 micrometers.

Especially advantageous in accordance with one embodiment of the invention is, in general, also an operating mode for which the repetition rate of the laser pulses is adjusted in the form of individual pulses or bursts depending on the relative speed between the laser and the glass or glass ceramic part, in order to achieve, in particular, a distance that also remains as constant as possible for different speeds. Therefore, the adjustment is made, in particular, such that, at a higher feed rate, a higher repetition rate is set.

In accordance with an enhancement of this embodiment, it is thereby provided that straight paths are traveled with higher repetition rates (and speeds) than, for example, curved path segments. In this way, it is also possible to produce complex geometries with high accuracies, but particularly also with high mean speeds.

In this case, the suitable pulse duration of a laser impulse lies in a range of less than 100 picoseconds, preferably at less than 20 picoseconds. The pulse duration can also lie at less than 1 picosecond. The typical power of the laser source thereby lies especially favorably in a range of 40 to 200 watts. In order to create the filamentary damages, in accordance with an advantageous enhancement of the invention, a pulse energy in the burst of more than 200 microjoules is used and, further advantageously, a total burst energy of more than 500 microjoules.

Preferably, a laser 10 with a power in a range of about 10 to 200 watts is used.

The laser energy deposited in the glass or glass ceramic part 3 is >300 µJ, preferably >400 µJ, and most preferably >500 µJ per laser pulse, in particular for laser pulses in the form of bursts.

In the case of an operation of the laser 10 in the burst mode, the repetition rate is the repetition rate of burst emission. The pulse duration is essentially dependent on whether a laser is being operated in individual pulse operation or in burst mode. The pulses within a burst typically have a similar pulse length to a pulse in individual pulse operation.

The filamentary damages 6 extend, following the light propagation, from the surface into the material, that is, in the direction of the opposite-lying side surface. If the insertion of these damages 6 is concluded, so that the damages form, as it were, a curtain extending below the provided separating line 4, this curtain composed of filaments that are arranged adjacent to one another or else lie on a zone found in the volume, then, subsequently, the glass or glass ceramic element 3 that is to be produced can be worked out.

Figure 2:
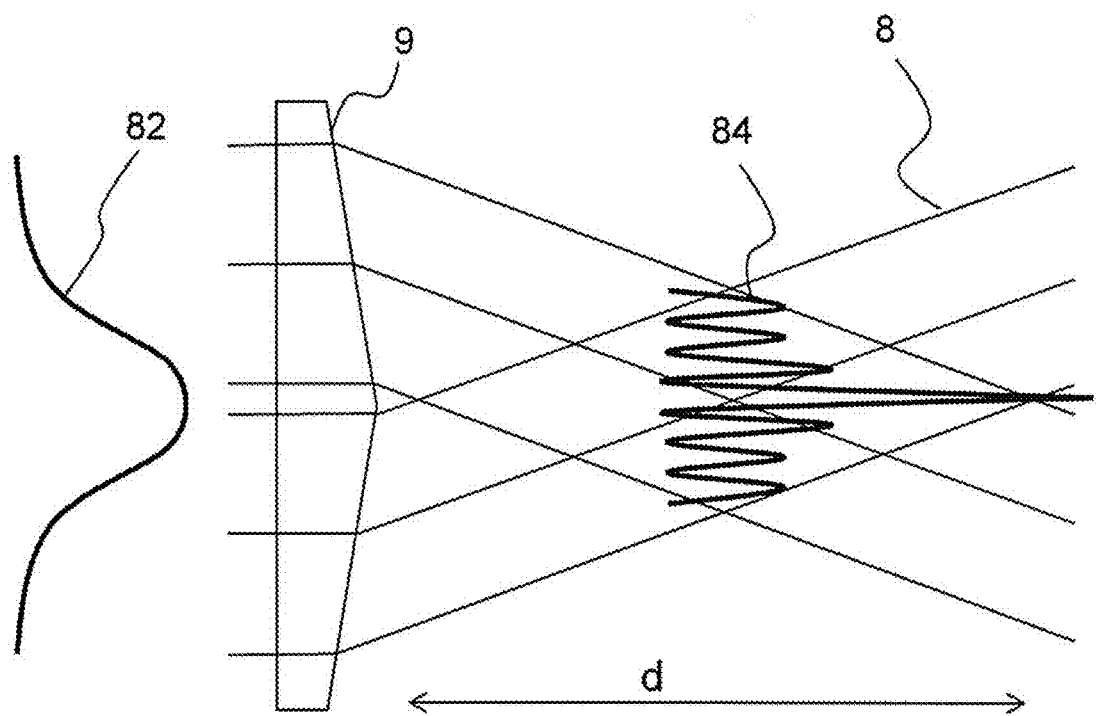
FIG. 2 an optical arrangement for the generation of a Bessel beam for the filamentation.

FIG. 2 shows schematically the beam path of the laser pulse 8 through an optical element 9 for the generation of a Bessel beam. With the Bessel beam, a line focus of the length d is created, along which an essentially constant light intensity in the region of the optical axis is present. In the illustration of FIG. 2, the beam path runs from left to right. The reference number 82 refers to the spatial intensity profile of the laser pulse 8 prior to impingement on the optical element. The laser pulse 8 typically has a Gaussian intensity profile. After passing through the optical element, a spatial intensity profile 84 is formed in the shape of a Bessel beam with strongly increasing intensity on the optical axis. This intensity profile is essentially maintained along the path d. Accordingly, the optical element 9 brings about a focusing on a line focus. In order to achieve a focusing of this kind, an axicon, in particular, is suitable as an optical element 9.

Figure 3:
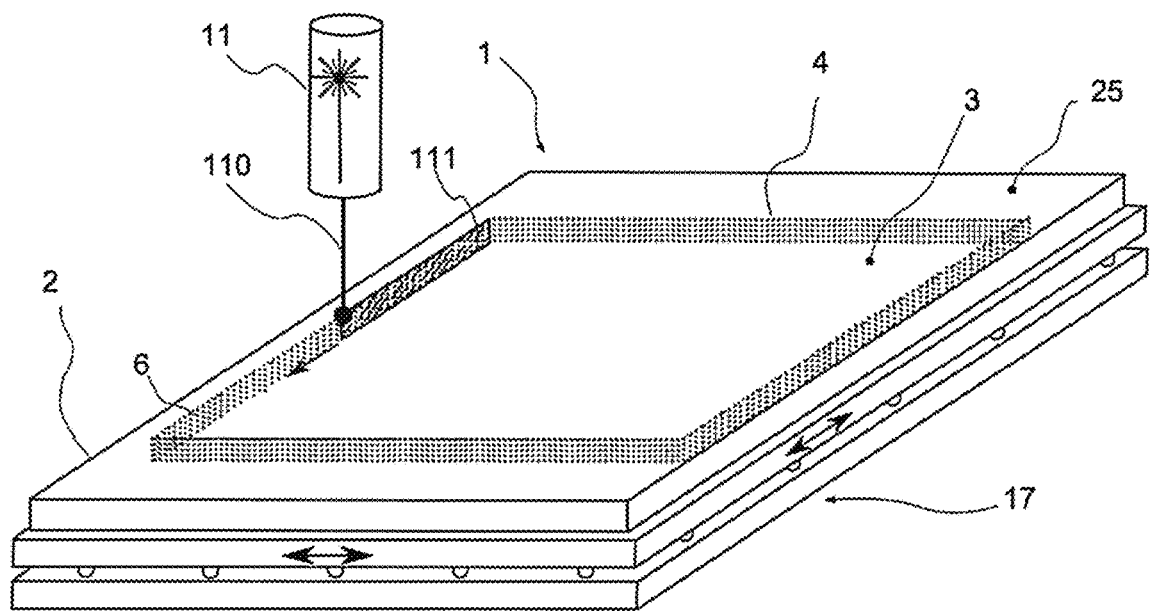
FIG. 3 a laser processing device for working an element out of a glass or glass ceramic part.

In general, without limitation to the described exemplary embodiments, the separation at the separating line 4 can occur or at least can be assisted in order to work out the glass or glass ceramic element 3 along the separating line through local heating of the glass or glass ceramic part (2). Especially suited for this purpose is heating by means of a laser beam. This step of the separation is illustrated by means of a laser in FIG. 3. The local heating is carried out by guiding the laser beam 110 of a $CO_2$ laser, in turn, along the separating line 4 over the side surface 25 of the glass or glass ceramic part 2. The same movement mechanism as for the step of insertion of the filamentary damages offers itself for use. Accordingly, for the example shown in FIG. 3, corresponding to the arrangement of FIG. 1, the laser is likewise held in fixed position and the glass or glass ceramic part 2 is moved by means of the XY table 17. This movement mechanism is obviously only given by way of example. Of key importance is the relative movement between the point of impingement of the laser beam and the glass or glass ceramic part 2. Due to the local heating, mechanical stresses are produced that lead to the formation of a crack 111 along the surface in which the filamentary damages 6 lie, and the glass or glass ceramic part 3 to be worked out is separated from the surrounding material.

Figure 4:
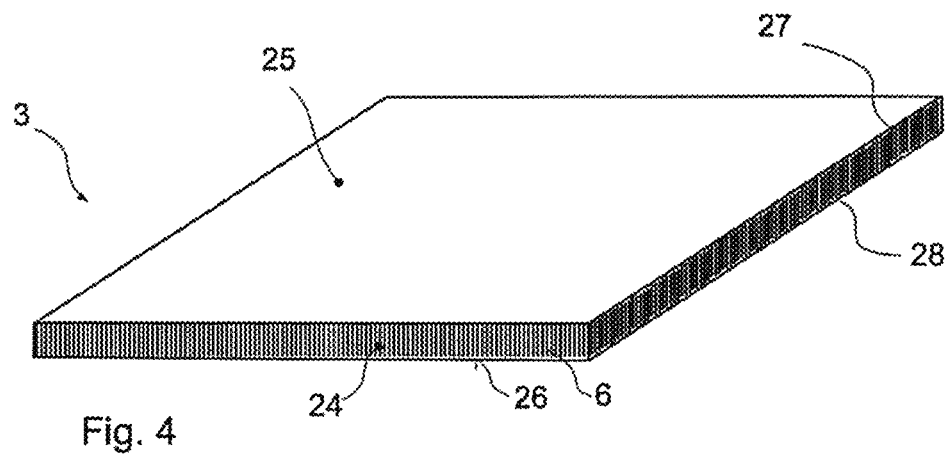
FIG. 4 an element worked out of a glass or glass ceramic part.

FIG. 4 shows the worked-out flat glass or glass ceramic part 3. The glass or glass ceramic element 3 has two opposite-lying edge faces 25, 26 as well as a peripheral edge face 24. The thickness of the element 3 preferably lies in the range of 1 to 20 millimeters, more preferably in the range of 5 to 15 millimeters. In the edge face, the laser structures in the form of filamentary damages 6, for example, can still be seen. They extend in their longitudinal direction in the direction of the one side surface 25 to the opposite-lying side surface 26. If the irradiation of the laser pulses 8 is perpendicular to the side surface 25, then the longitudinal direction of the filamentary damages accordingly lies in the direction of the surface normal of the side surface 25.

In comparison to conventional separation methods, this method has the advantage of a high accuracy. Thus, for a thickness of the glass or glass ceramic part of 4 mm in conventional scoring and breaking, an allowance of, for example, 0.6 mm is observed. The provided exact dimensions are then produced by grinding to the correct dimension. An infeed of 1-2 mm, such as, for example, 1.3 mm, per side is required for the grinding. With increasing thickness of the glass or glass ceramic part, the inaccuracies increase further during cutting. Accordingly, a larger allowance is to be taken into consideration.

In contrast, in the method according to the invention, at most during clamping of the glass or glass ceramic part, inaccuracies result when the contour of the element to be produced cannot be traveled over in a continuous processing step with the ultrashort-pulse laser. Such inaccuracies are typically in the range of less than 0.2 mm, preferably 0.1 mm, more preferably less than 0.05 mm.

In accordance with the invention, however, the edge processing does not conclude when the glass or glass ceramic part 3 is worked out of the glass. A mechanical fine processing still needs to be carried out. However, this mechanical fine processing is preferably carried out in such a way that the outer dimensions are not further reduced. In any case, the edge surface 24 of the glass or glass ceramic element 3 that is formed by separation is partially processed by grinding in such a way that the edge surface 24 has at least one strip-shaped region produced by the insertion of the filamentary damages and the separation, and an adjoining strip-shaped region that is further processed by grinding.

Figure 5:
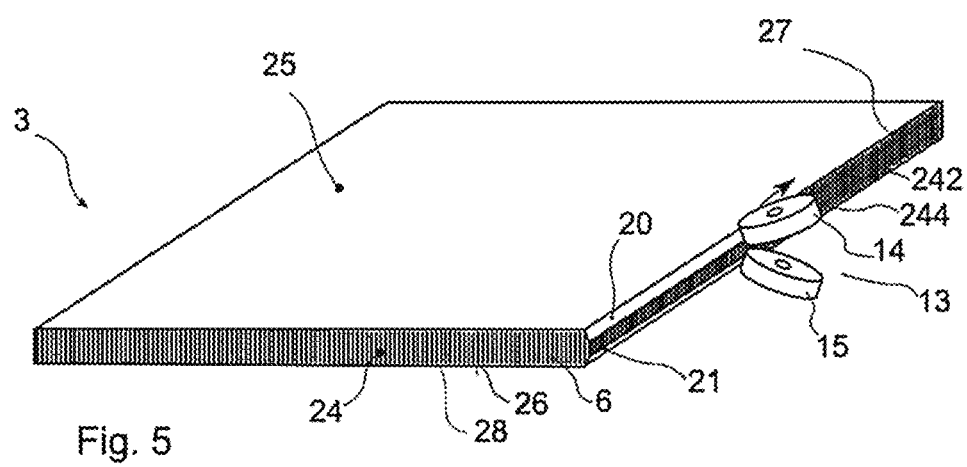
FIG. 5 the further processing of the glass or glass ceramic part by grinding of strip-shaped edge regions.

FIG. 5 shows the glass or glass ceramic element 3 in the case of the further edge processing explained above. The edges 27, 28 at the transition between the edge surface 24 and the side surfaces 25, 26 are still sharp and correspondingly sensitive. The profile of the edge surface is altered here by edge grinding in order to make these edges insensitive to impacts. For this purpose, strip-shaped regions 242, 244 adjoining the side surfaces 25, 26 are processed such that the edges 27, 28 are rounded. In the example shown in FIG. 5, the grinding of the strip-shaped regions 242, 244 of the edge surface 24 is carried out with a grinding device 13 that has two rotating grinding heads 14, 15. The grinding device 13 is moved along the marked arrow at the edge surface 24, so that the areas 242, 244, including the edges 27, 28, are ground at an angle.

In general, the grinding can produce a facet, which forms a transition from the edge surface 24 to the adjoining side surface 25, 26. Preferably, as is also the case for the example shown in FIG. 5, at least one facet 20, 21 is ground at the edge of each of the side surfaces 25, 26.

Figure 6:
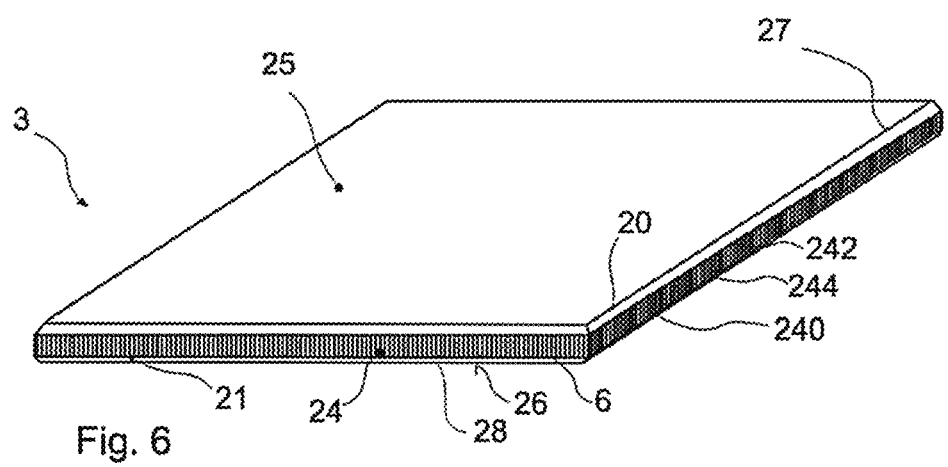
FIG. 6 the completely processed glass or glass ceramic element.

FIG. 6 shows the completely processed glass or glass ceramic element 3 with facets 242, 244 on the two sides. As a result of the above-described production, the edge surface 24 of the glass or glass ceramic element 3 then has at least one first elongate, strip-shaped edge region 240 and at least one second elongated strip-shaped edge region—in this case, two edge regions 242, 244—which are formed by a ground edge. These edge regions 240, 242, 244 extend in the longitudinal direction along the longitudinal direction of the edge surface 24. In this case, the first edge region 240 has the elongated filamentary damages 6 that are parallel and adjacent to one another and equidistantly spaced that are inserted by the laser processing. The longitudinal direction thereof extends transversely, preferably perpendicularly to the side surfaces 25, 26 and along the surface of the first edge region 240. Because the glass or glass ceramic part 3 was separated at the filamentary damages 6, said damages can be present in the surface of the first edge region 240, in particular as trough-shaped, elongated depressions.

Figure 7:
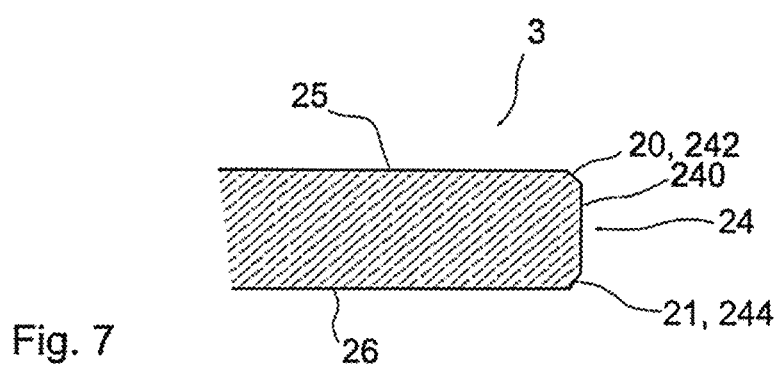
FIG. 7 in cross section, an edge with facets.

For clarification of the previously described embodiment, FIG. 7 shows the cross-sectional shape of an edge of a glass or glass ceramic element 3 that has a faceted ground edge and has been processed as described above. The edge surface 24 is formed by a first edge region 240, wherein the transition to the side surfaces 25, 26 is formed in each case by a second edge region 242, 244 formed as a narrow facet 20, 21. The inclination of the second edge regions 242, 244 lies in each case between the inclination of the first edge region 240 and the adjoining side surface 25 or 26. The corresponding situation then also applies for the directions of the normals. Accordingly, in this case, the second edge regions 242, 244 each form a facet 20, 21, the normal direction of which lies between the normals of the first edge region 240 and the normals of the side surfaces 25, 26 that adjoin the facet.

Figure 8:
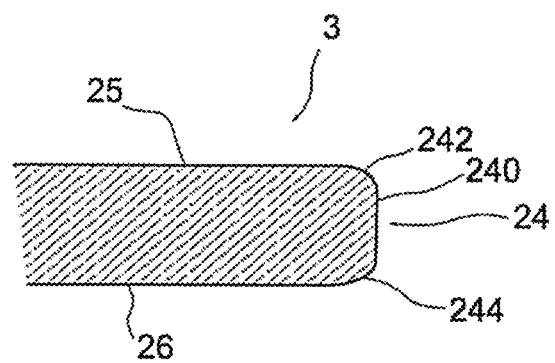
FIG. 8 in cross section, an edge with a C-cut.

FIG. 8 shows another embodiment of the invention. In this embodiment, a C-shape of the edge surface is produced by the first edge region 240 and the second edge regions 242, 244. In accordance with this embodiment of the invention, in the flat glass or glass ceramic element 3, the edge surface 24 has, in particular, at least in some areas, a C-shaped profile, in which the first edge region 240 extends between two curved second edge regions 242, 244.

As in the case of the example shown in FIG. 7, here, too, the second edge regions 242, 244 frame the first edge region 240 and form the transition from the first edge region 240 to the side surface 25 or 26. Owing to the linear propagation of the light, as in the case of the other embodiments of the invention, the first edge region 240 extends in a straight line in cross section. Due to the curving of the surface of the second edge regions 242, 244, the inclination of the surface of both the first edge region and also the side surface approaches the inclination of these adjoining surface regions. However, it is not thereby ruled out that edges are still present at the transitions. The C-cut is especially insensitive with respect to damages at the edge. It is clear to the person skilled in the art that the exemplary embodiments in accordance with FIG. 7 and FIG. 8 can also be combined with each other. On the one hand, the peripheral edge can have sections with a C-cut and sections with facets. It is also possible at a side surface to provide a facet in accordance with FIG. 7 and, on the opposite-lying side, to provide a rounded edge region of a C-cut. Finally, it is also possible for facets to be present at both side surfaces in addition to the rounded edge regions.

The method according to the invention will be compared below with a conventional method for the cutting of a glass or glass ceramic part 3. In both examples, a sheet of soda-lime glass with a thickness of 8 mm served as substrate. In conventional processing, scoring was conducted with a diamond scoring wheel and then the glass element was worked out by breaking. The insertion of the C-cut was produced in two steps, with a grit D121 and a feed of 8 m/min, then with a grit D76 and a feed of 5 m/min.

In accordance with the invention, a sheet of glass was perforated by means of a picosecond laser with wavelength of 1064 nm, a repetition rate of 100 kHz, and laser pulses composed of 4 bursts. The perforation distance, that is, the center-to-center distance between adjacent filamentary damages, was 5 µm. The separation occurred by tracing the separating line with the laser beam of a $CO_2$ laser. The laser spot had a diameter of 8 mm and the laser power was 260 W. The curved edge regions of the C-cut were inserted by a single grinding with a grit D76 and a feed of 12.5 m/min. Because the course of the edge is more exactly defined than during scoring and breaking and only the curved transition regions from the edge to the side surfaces need to be produced, a single grinding step suffices, in comparison to the conventional processing method. In addition, the grinding can be conducted at a higher feed rate. In general, without limitation to the special exemplary embodiments that are shown in the figures, feed rates during grinding, that is, the relative movement between the grinding device 13 and the surface of the glass or glass ceramic part 2, in the range of 5 meters per minute to 40 meters per minute, more preferably in the range up to 20 meters per minute, are favorable for the method according to the invention.

Figure 9:
FIG. 9 a micrograph of a filamented and subsequently ground edge.

FIG. 9 shows a micrograph of a ground edge according to the invention, that is, a ground edge that has been pre-separated by filamentation and subsequently ground. In this image, diagonally running grinding traces can be seen in the region 242 and are absent in the strip-shaped edge region 240 produced by filamentation. However, the micrograph shows that the roughnesses of the two regions are similar. Optically and haptically, the differently processed edge regions therefore appear to be essentially indistinguishable. The filamentary damages cannot be seen in the enlargement of the images shown in FIG. 9.

LIST OF REFERENCE NUMBERS 1 laser processing device
2 glass or glass ceramic part
3 glass or glass ceramic element worked out of the glass or glass part 2
4 separating line
6 filamentary damage
8 laser pulse
9 optical element
10 ultrashort-pulse laser
11 $CO_2$ laser
13 grinding device
14, 15 grinding heads
17 XY table
20, 21 facets
24 edge surface
25, 26 side surfaces
27, 28 edge
80 point of impingement of a laser pulse 8 on surface 20
82 spatial intensity profile of the laser pulse 8 prior to focusing
84 spatial intensity profile of the laser pulse after focusing
110 laser beam of 10
111 crack
240 strip-shaped region processed by filamentation
242, 244 strip-shaped region post-processed by grinding

What is claimed is:
1. A flat glass or glass ceramic element, comprising:
two opposite-lying side surfaces and an edge surface connecting the two opposite-lying side surfaces, wherein the edge surface comprises a first strip-shaped edge region and a second strip-shaped edge region, the first strip-shaped edge region comprising elongated, parallel filamentary damages that are adjacent to one another and extend in a longitudinal direction, the longitudinal direction extending transversely to the two opposite-lying side surfaces, the second strip-shaped edge region being a ground edge that extends in the longitudinal direction and joins the first strip-shaped edge region and one of the two opposite-lying side surfaces.

2. The flat glass or glass ceramic element of claim 1, wherein the second strip-shaped edge region comprises diagonally running grinding traces that are absent in the first strip-shaped edge region.

3. The flat glass or glass ceramic element of claim 2, wherein the grinding traces of the second strip-shaped edge region and the filamentary damages of the first strip-shaped edge region have roughnesses that are similar.

4. The flat glass or glass ceramic element of claim 2, wherein the grinding traces of the second strip-shaped edge region and the filamentary damages of the first strip-shaped edge region are optically and haptically indistinguishable.

5. The flat glass or glass ceramic element of claim 1, wherein the edge surface further comprises another second strip-shaped edge region, the another second strip-shaped edge region being a ground edge that extends in the longitudinal direction and joins the first strip-shaped edge region and the other of the two opposite-lying side surfaces.

6. The flat glass or glass ceramic element of claim 1, further comprising a thickness in a range of 1 to 20 millimeters.

7. The flat glass or glass ceramic element of claim 1, wherein the second strip-shaped edge region has a C-shaped profile.

8. The flat glass or glass ceramic element of claim 1, wherein the second strip-shaped edge region forms a facet between the first strip-shaped edge region and the one of the two opposite-lying side surfaces.

9. A flat glass or glass ceramic element, comprising:
two opposite-lying side surfaces; and
an edge surface having a first ground region, a second ground region, and a central region,
wherein the central region has a plurality of elongated, parallel filamentary damages that are adjacent to one another and extend in a longitudinal direction, the longitudinal direction extending transversely to the two opposite-lying side surfaces
wherein the first ground region joins one of the two opposite-lying side surfaces to the central region, and
wherein the second ground region joins another of the two opposite-lying side surfaces to the central region.

10. The flat glass or glass ceramic element of claim 9, wherein the first ground region and/or the second ground region lack any of the plurality of elongated, parallel filamentary damages present in the central region.

11. The flat glass or glass ceramic element of claim 9, wherein the first ground region and/or the second ground region comprises diagonally running grinding traces that are absent in the central region.

12. The flat glass or glass ceramic element of claim 11, wherein the grinding traces and the filamentary damages have roughnesses that are similar.

13. The flat glass or glass ceramic element of claim 11, wherein the grinding traces and the filamentary damages are optically and haptically indistinguishable.

14. The flat glass or glass ceramic element of claim 9, further comprising a thickness between the two opposite-lying side surfaces along the longitudinal direction in a range of 1 to 20 millimeters.

15. The flat glass or glass ceramic element of claim 9, wherein the first ground region and/or the second ground region comprise curved regions.

16. The flat glass or glass ceramic element of claim 9, wherein the first ground region and/or the second ground region comprise straight regions.

* * * * *